United States Patent [19]

Pugin et al.

[11] 3,759,947

[45] Sept. 18, 1973

[54] TERT-SILYL AND TERT-ALKYL PHTHALOCYANINE DYESTUFFS

[75] Inventors: Andre Pugin, Riehen; Heinrich Hopfe, Kusnacht; Pasquale Gallegra, Zurich, all of Switzerland

[73] Assignee: Ciba-Geigy AG, Basel, Switzerland

[22] Filed: Nov. 13, 1970

[21] Appl. No.: 89,501

Related U.S. Application Data

[63] Continuation of Ser. No. 758,671, Sept. 10, 1968, abandoned, which is a continuation-in-part of Ser. No. 717,382, March 29, 1968, abandoned.

[30] Foreign Application Priority Data

Sept. 15, 1967  Switzerland.................... 12945/67
Apr. 7, 1967    Switzerland..................... 4980/67

[52] U.S. Cl........... 260/314.5, 260/37 N, 260/37 P, 260/41 C, 117/132, 106/243, 106/288, 8/1 X, 8/54.2, 8/162 R, 8/177 R, 8/179, 8/180
[51] Int. Cl............................................ C09b 47/04
[58] Field of Search......................... 260/314.5; 8/1; 106/288

[56] References Cited
UNITED STATES PATENTS 3,094,536   6/1963   Kenney et al.................... 260/314.5

Primary Examiner—Harry I. Moatz
Attorney—Wenderoth, Lind & Ponack

[57] ABSTRACT

Unmetallized and metallized phthalocyanine dyestuffs being substituted in the benzene nuclei of the phthalocyanine system by from one to four organically trisubstituted tertiary silyl or alkyl groups are described, which dyestuffs are useful for the coloring of synthetic macromolecular materials of polymerizates and polycondensation products, in particular by dyeing in the mass especially of synthetic polyamide and polyolefine fibers; those of the new dyestuffs containing three or, preferably, four tertiary silyl or alkyl groups per phthalocyanine nucleus being of particularly good solubility in certain organic solvents and also useful, apart from the above purposes, for the dyeing of lacquer raw materials, while those new dyestuffs having fewer tertiary silyl or alkyl groups and especially those having only one tertiary silyl or alkyl group per phthalocyanine nucleus are useful as pigments and for the coloring, in the mass, of polyolefin fibers.

5 Claims, No Drawings

TERT-SILYL AND TERT-ALKYL PHTHALOCYANINE DYESTUFFS

This application is a continuation application of our application Ser. No. 758,671, filed on Sept. 10, 1968 and now abandoned, which in turn is a continuation-in-part of our application Ser. No. 717,382, filed Mar. 29, 1968, and now abandoned.

DETAILED DISCLOSURE

The present invention concerns new phthalocyanine dyestuffs containing silyl or tertiary alkyl groups, processes for the production of these dyestuffs, their use for the dyeing or pigmenting of organic materials, particularly of raw materials for lacquers or synthetic polymers or condensation products in the mass, as well as, as industrial products, the organic materials dyed or pigmented with the aid of the new dyestuffs.

It has been found that new, valuable phthalocyanine dyestuffs containing silyl or tertiary alkyl groups are obtained by subjecting four moles of optionally ring-substituted o-phthalic acids or reactive derivatives thereof, of which four moles at least one contains a tertiary silyl or alkyl radical, to a condensation reaction under conventional reaction conditions, optionally in the presence of compounds yielding a complex-forming metal atom and of substances introducing nitrogen, thereby obtaining phthalocyanine dyestuffs containing tertiary silyl or alkyl groups.

More in particular the invention provides metal-free or metallized phthalocyanine dyestuffs which consist, per molar equivalent thereof, of a. one molar equivalent of a phthalocyanine nucleus of the formula

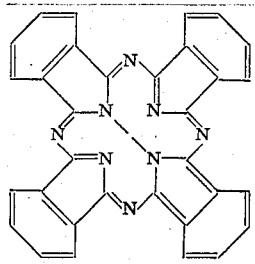

the free bonds of the phthalocyanine nucleus being occupied each by hydrogen or together by a metal atom selected from copper, cobalt, nickel, aluminum, iron, chromium, zinc, magnesium, manganese, lead, tin or titanium, copper and nickel being preferred;

b. from one to four molar equivalents of a silyl or tert-alkyl grouping linked to a benzene ring of such phthalocyanine nucleus which is of the formula

wherein

X represents carbon or silicon, and in the case of X being $Si$, each of $R_1$ and $R_2$ represents alkyl preferably of from 1 to 5 carbon atoms, a phenyl-lower alkyl radical, cycloalkyl, preferably cyclohexyl or an aryl, preferably a phenyl radical and $R_3$ represents alkyl preferably of from 1 to 5 carbon atoms, or a phenyl-lower alkyl radical, any substituent of said phenyl-lower alkyl radical and of said phenyl radical being halogen;

and in the case of X being C, $R_1$, $R_2$ and $R_3$ each represents an alkyl radical, the three alkyl radicals together having, at most, 20 carbon atoms;

not more than one such silyl or alkyl grouping being linked to one and the same benzene ring of such phthalocyanine nucleus;

any tertiary silyl grouping-bearing benzene ring of such phthalocyanine nucleus being free from other substituents or being further substituted by halogen;

any tertiary silyl or alkyl grouping-free benzene ring of such phthalocyanine nucleus being optionally substituted by substituents selected from halogen, particularly chlorine or bromine, lower alkoxy, lower alkyl and phenyl;

and any tertiary alkyl group-bearing benzene ring of such phthalocyanine nucleus being free from the substituents or being further substituted by halogen, particularly chlorine or bromine, or by lower alkoxy, e.g. by a methoxy or ethoxy group.

Advantageously the benzo radicals of the phthalocyanine nucleus are not further substituted.

In preferred dyestuffs according to the invention in which X represents Si, unsubstituted alkyl radicals $R_1$, $R_2$ or $R_3$ which can be of straight or branched chain have each preferably not more than 5 carbon atoms. The methyl, ethyl, propyl, isopropyl, n-, sec. or tert-butyl or the amyl or 2,2-dimethylpropyl group can be mentioned as examples thereof. If $R_1$, $R_2$ or $R_3$ are substituted alkyl radicals then these are, particularly, benzyl, methylbenzyl or phenylethyl radicals. When $R_1$ or $R_3$ represents a cycloalkyl radical this is, particularly, the cyclohexyl group; if they represent an aryl radical then this is principally a mononuclear, aromatic-homocylic radical preferably the unsubstituted phenyl radical, or it is a phenyl radical optionally substituted by halogen.

Among dyestuffs according to the invention in which X represents C, those are preferred in which $R_1$ and $R_2$ represent alkyl radicals each of which has not more than 5 carbon atoms and $R_3$ represents an alkyl radical having up to 10 carbon atoms inclusive. The alkyl radicals $R_1$ and $R_2$ are, in particular, the methyl, tert-butyl or 2,2-dimethylpropyl group; $R_3$ is, in particular, the methyl, tert-butyl, 2,2-dimethylpropyl or 2,2,4,4-tetramethylpentyl group. Preferably, each of $R_1$, $R_2$ and $R_3$ represents the methyl group; more particularly in the case of X being C, the tertiary alkyl radical

represents the butyl group or the 1,1,3,3,-tetramethylbutyl group.

The novel tertiary silyl or alkyl groups-containing phthalocyanine dyestuffs according to the invention are useful as pigments or dyestuffs, depending on their solubilities in organic solvents.

Those of the novel dyestuffs which contain three or preferably four molar equivalents of silyl groups or four equivalents of tertiary alkyl groups, per molar equivalent of phthalocyanine nucleus are surprisingly of good to excellent solubility in organic solvents such as aromatic hydrocarbons, e.g. benzene, toluene, xylenes or naphthalene, pyridine and the silyl-containing dyestuffs also in nitrobenzene, dichloro- or trichloro-benzene, chloronaphthalene, methoxybenzene or N-methyl-pyrrolidone; furthermore, these last mentioned tertiary silyl- and alkyl-containing dyestuffs are well soluble in halogenated lower aliphatic hydrocarbons such as carbon tetrachloride or chloroform; and the silyl-containing ones also in ethyleneglycol-monomethyl- or monoethylether, dimethyl formamide and dimethyl sulfoxide.

Especially in those phthalocyanine dyestuffs according to the invention in which X represents C, solubility in organic solvents increases with increasing number of carbon atoms in the alkyl radical $R_3$; e.g. those in which $R_3$ is a tertiary nonyl group, particularly the 2,2,4,4,-tetramethylpentyl group, and $R_1$ and $R_2$ each represent the methyl group, are soluble even in dimethyl formamide or acetone.

Because of their purity, great color strength and very good solubility in aromatic hydrocarbons, the phthalocyanine dyestuffs according to the invention are suitable for the dyeing of organic materials, particularly raw materials for lacquers, as well as of synthetic polymers or condensation products such as polystyrene, cellulose esters, e.g. acetate rayon, cellulose-2½- and tri-acetate, condensation products of aromatic dicarboxylic acids and polyalcohols, e.g. polyethylene glycol terephthalate, polyacrylonitrile, and polyolefines in the melt, which can then be further processed to form films or foils, spun into filaments or cast into sheets. They are particularly suitable for the coloring of synthetic polyamide material or polyester material in the mass, especially by adding them to a polyamide melt or to the polymerisation mixture from which the polyamide is produced. The melt is then further processed, e.g. it is spun to filaments. When used in this manner there are obtained blue to green-blue colored synthetic fibers of good color strength which are distinguished from those attained with soluble phthalocyanine dyestuffs by the purity of their shade and their excellent fastness to light and weathering fastness. It is very surprising that the tertiary silyl- and alkyl phthalocyanines according to the invention are not decomposed under the strongly reductive polyamide polymerisation conditions, for it is well known that butyl substituents are split off with relative ease from the benzene nucleus, for instance by heating or with sulfuric acid, or in a reductive cyanuric melt.

The purity of shade of dyeings on polyamide and the like fibers with the dyestuffs according to the invention is at least as good as that obtainable with the well-known Zapon Fast blue and Zapon Fast green dyestuffs while their fastness to light and weathering fastness is far superior to that of dyeings with the last mentioned dyestuffs. Because of their pure shades and good solubility, they can also be used for the toning up of black printing inks. Those dyestuffs according to the invention which contain from one to two molar equivalents of tertiary silyl or alkyl groups per molar equivalent of phthalocyanine nucleus are substantially insoluble in organic solvents, are useful as pigments, and for coloring polyolefin especially polypropylene fibers by addition to the mass from which the fibers are spun. Blue-colored polyolefin fibers of deep blue shades can be obtained in this way due to the good compatibility of these tertiary silyl and alkyl phthalocyanines and the polyolefin.

These latter dyestuffs can also be used as stabilisers, since they do not have a tendency to flocculate, which is an essential prerequisite in attaining strong color depths, e.g. in lacquers. By flocculation is meant the agglomeration of pigment particles dispersed in a liquid to form larger particles.

Phthalocyanine dyestuffs containing four tertiary alkyl groups according to the invention, which are further substituted in the benzo nucleus of the phthalocyanine radical by, e.g. halogen or alkoxy groups, are valuable green pigments which are insoluble in aromatic hydrocarbons, which are suitable for the pigmenting of organic materials, particularly printing inks or polyvinyl chloride foils, in fast green shades.

Because of their excellent overall fastness properties and stability, the Cu—, Co—, Ni— and metal-free phthalocyanine dyestuffs are preferred.

The o-phthalic acids or reactive derivatives thereof containing tertiary silyl or alkyl groups, which can be used as starting materials are new. As reactive derivatives thereof which can be used according to the invention, principally the benzene-o-dicarboxylic acid anhydrides, -o-dinitriles, -o-dicarboxylic acid imides, -o-dicarboxylic acid amides, -o-monocarboxylic acid-monocarboxylic acid amides, o-monocarboxylic acid amide-mononitriles containing a tertiary silyl or alkyl radical, as well as 1,3-bis-imino-isoindolines or 3-imino-isoindolin-1-ones containing a tertiary silyl or alkyl radical in the benzo moiety are mentioned.

Starting materials containing a tertiary silyl group are obtained, e.g. by reacting a tertiary silyl halide, particularly a silyl chloride, and a haolgen-o-xylene with the aid of alkali metals, advantageously sodium, according to Wurtz-Fittig, and oxidising the o-xylene-containing silyl groups obtained, in a conventional manner, e.g. in aqueous solution with potassium permanganate, to form the corresponding o-dicarboxylic acid, and optionally, converting the latter into the desired reactive derivative.

The oxidation to the o-dicarboxylic acid can also be performed with $CrO_3$, $HNO_3$ or with air e.g. using vanadium pentoxide. 1,3-bis-imino-isoindoline or 3-imino-isoindolin-1-one containing a tertiary silyl radical is obtained e.g. from a phthalodinitrile containing a tertiary silyl radical by treating it with ammonia under pressure or treating it with sodium amide in formamide.

o-Phthalic acids or reactive derivatives thereof in which the tertiary silyl group is in the p-position to the —CO— or —CN— group are preferred as starting materials for making the dyestuffs according to the invention because of their more easy accessibility.

The following are mentioned as examples of particularly suitable reactive derivatives of o-phthalic acids containing tertiary silyl groups:

3-(trimethylsilyl)-phthalic acid anhydride,
4-(trimethylsilyl)-phthalic acid anhydride,
4-(triethylsilyl)-phthalic acid anhydride,
4-(tri-n-butyl-silyl)-phthalic acid anhydride,
4-(methyl-di-phenyl-silyl)-phthalic acid anhydride,
4-(tribenzyl-silyl)-phthalic acid anhydride,
4-(dimethyl-amyl-silyl)-phthalic acid anhydride,
4-(dimethyl-cyclohexyl-silyl)-phthalic acid anhydride,
4-(diethyl-phenyl-silyl)-phthalic acid anhydride,
4-(diethyl-p-chlorophenyl-silyl)-phthalic acid anhydride, 4-(dimethyl-p-chlorophenyl-silyl)-phthalic acid anhydride,
4-(diethyl-o-chlorophenyl-silyl)-phthalic acid anhydride,
4-(dimethyl-p-bromophenyl-silyl)-phthalic acid anhydride,
4-(dipropyl-methyl-silyl)-phthalic acid anhydride,
4-(dimethyl-p-chlorobenzyl-silyl)-phthalic acid anhydride,
4-(methyl-ethyl-phenyl-silyl)-phthalic acid anhydride,
4-(trimethylsilyl)-3-chloro-phthalic acid anhydride, and
4-(trimethylsilyl)-1,2-dicyanobenzene.

Those silyl groups-containing phthalocyanine dyestuffs according to the invention which have, per molar equivalent thereof, one to three molar equivalents of a silyl radical per molar equivalent of phthalocyanine nucleus, are produced by condensing together, the same condensation reaction, from one to three molar equivalents of a monosilyl-phthalic acid or reactive derivative of such acid, e.g. those acids specifically mentioned above, or their reactive derivatives, e.g. anhydride, nitriles, etc. and from three to one molar equivalents of a silyl-free phthalic acid or reactive derivative thereof, preferably the acid anhydride, under the same conventional reaction conditions as can be used for condensing tetrasilyl phthalocyanine dyestuffs.

Silyl-free phthalic acids suitable for use in such "mixed syntheses" reaction are, for instance, phthalic acid, phthalic anhydride, phthalic nitrile, 3-chloro- or 4-chlorophthalic acids, 3-bromo- and 4-bromophthalic acids, 3,4-, 3,5-, 3,6- and 4,5-dichloro-phthalic acids, 3,4-, 3,5-, 3,6- and 4,5-dibromo-phthalic acids, tetrachloro-phthalic acid, 3-hydroxyphthalic acid, 3-methoxy- and 4-methoxy-phthalic acids, 3-methyl- and 4-methyl-phthalic acids, 3,6-dimethyl- and 3,5-dimethylphthalic acids, 3,4,6-trimethyl-phthalic acid, 3,4,5,6-tetra-methyl-phthalic acid and 4-phenylphthalic acid, and the anhydrides of these acids.

Starting materials which contain a tertiary alkyl group are obtained, e.g. by reacting a tertiary alkyl halide, particularly a chloride, and o-xylene in the presence of a condensing agent, advantageously zinc chloride, and oxidising the o-xylene containing tertiary alkyl groups obtained in the usual way, e.g. with chromium trioxide in glacial acetic acid or sulfuric acid, with dilute nitric acid or with potassium permanganate in aqueous or aqueous-pyridine solution, to form the corresponding o-dicarboxylic acid and, optionally, then converting this into the desired reactive derivative. Also, olefins such as isobutylene, di-isobutylene or tri-isobutylene can be added to o-xylene in the presence of a condensing agent such as BF$_3$, AlCl$_3$, HF or concentrated H$_2$SO$_4$, to form the o-xylene containing tertiary alkyl groups and this can be oxidised as described above.

1,3-bis-imino-isoindoline or 3-imino-isoindolin-1-one containing a tert-alkyl radical is obtained e.g. from a phthalodinitrile containing a tert-alkyl radical by treating it with ammonia under pressure or treating it with sodium amide in formamide.

Because of their easy accessibility and, therefore, greater economy in use, o-phthalic acids usable according to the invention or their reactive derivatives containing a tertiary alkyl group, particularly a tert-butyl or iso-octyl group, in p-position to a —CO— or —CN— group, are preferred. Good to very good yields of these starting materials which are free from side products which are difficult to remove and which deaden the end products very much are obtained because tertiary alkyl groups, particularly the tertiary butyl group, in contrast to normal or secondary alkyl groups, are stable to oxidation.

The following are mentioned as examples of particularly suitable o-phthalic acids or reactive derivatives thereof containing a tertiary alkyl group which can be used according to the invention: 4-tert-butyl phthalic acid, 4-tert-butyl phthalic acid anhydride, 4-tert-butyl-5-methoxy- or -5-chlorophthalic acid, 4-tert-butyl-1,2-dicyanobenzene, 1,1,2,2-tetramethylpropyl phthalic acid, 1,1,3,3-tetramethylbutyl phthalic acid and 1,1,3,3,5,5-hexamethylhexyl phthalic acid.

Those alkyl group containing phthalocyanine dyestuffs according to the invention which have, per molar equivalent thereof, one to three molar equivalents of a tert-alkyl radical per molar equivalent of phthalocyanine nucleus, are produced by condensing together, the same condensation reaction, from one to three molar equivalents of a monoalkyl-phthalic acid or reactive derivative of such acid, e.g. those acids specifically mentioned above, or their reactive derivatives, e.g. anhydride, nitriles, etc. and from three to one molar equivalents of an alkyl-free phthalic acid or reactive derivative thereof, preferably the acid anhydride, under the same conventional reaction conditions can be used for condensing tetraalkyl phthalocyanine dyestuffs.

Alkyl-free phthalic acids or reactive derivatives thereof suitable for use in such "mixed syntheses" reaction are, for instance, phthalic acid, phthalic anhydride, phthalic nitrile, 1,2-dicyanobenzene or 3- or 4-chlorophthalic acid.

The metal-containing phthalocyanine dyestuffs according to the invention can be produced by the methods conventionally used in the production of metal phthalocyanines. For example, a metal, metal oxide or metal salt, particularly a metal chloride such as anhydrous copper-(II) chloride or nickel chloride, is heated to 80°–300°C, advantageously to 150°–220°C, optionally in the presence of an inert salt or, advantageously, a high boiling inert solvent as diluent, with 4 moles, per gram atom of metal, of a reactive o-phthalic acid derivative containing at least two equivalents of nitrogen such as an o-phthalodinitrile or a 1,3-bis-imino-isoindoline derivative, of which four moles at least one contains a tertiary silyl or alkyl radical.

Depending on the metal used, e.g. nitrobenzene, trichlorobenzene, pyridine, benzyl alcohol, glycol, glycol monomethyl- or monoethylether or formamide are used as high boiling inert solvents.

As inert salt sodium sulfate can be used. If a reactive o-phthalic acid derivative containing 2 or less equivalents of nitrogen, such as an o-phthalic acid anhydride, o-phthalic acid imide, o-phthalic acid diamide, o-cyano- or o-carboxybenzoic acid amide or 3-imino-isoindolin-1-one containing a tertiary silyl or alkyl radical is used as starting material, the condensation to form the metal phthalocyanine dyestuff can be performed by reaction with a metal-affording compound especially a metal salt in the presence of an agent giving off ammonia such as urea, and in the presence of catalysts such as preferably ammonium molybdate. The catalyst is advantageously used in amounts of 0.1 to 5 percent by weight, calculated on the total amount of the reaction components. The additional use of other catalysts such as boric acid is optional.

Substances which can be used in the instant process for the introduction of nitrogen are e.g. ammonia, ammonium carbonate, ammonium carbamate, biuret, aminosulfonic acid, ammonium sulfamate, formamide, and particularly urea. The condensation can be performed in the melt, e.g. in excess urea, or in suspension in an inert, high boiling organic solvent such as nitrobenzene or trichlorobenzene, at 130°–250°C.

Preferably about 1 mole of metal or compound giving off metal is used to 4 moles of phthalic acid or derivatives thereof. The reaction is generally complete after a few hours.

Thus, depending on the metal, metal oxide or metal salt used, metal phthalocyanine complexes having stable, covalent bonds such as the Cu—, Co—, Ni—, Al, Fe—, Cr— or Zn— phthalocyanine dyestuffs; metal phthalocyanine complexes having labile covalent bonds such as the Mg—, Mn—, Pb—, Sn— or Ti— phthalocyanine dyestuffs; and metal phthalocyanine complexes containing metals in ionic linkage such as the Na—, K—, Li—, Ca—, Ba— or Ag— phthalocyanine dyestuffs can be produced. These latter metal phthalocyanine complexes can then be converted e.g. by acid hydrolysis or by alcoholysis into the corresponding metal-free phthalocyanine dyestuffs.

The new dyestuffs are isolated from the reaction mixture, e.g. by precipitation with lower alkanols such as methanol, ethanol, isopropanol or butanol or by removal of the solvent, e.g. by distillation or with steam. They are then isolated in the usual way by filtration. The crude dyestuffs can be purified, e.g. by alternately extracting with dilute aqueous mineral acids and alkalies. If desired, the dyestuffs so obtained can be further purified by recrystallisation, e.g. from dimethyl formamide, carbon tetrachloride, cellosolve or N-methylpyrrolid-2-one.

The following non-limitative examples illustrate the invention further. The temperatures are given therein in degrees Centigrade. Percentages are given by weight unless expressly stated otherwise.

EXAMPLE 1 a. 100 g of 4-chloro-o-xylene and 80 g of trimethylchlorosilane are dissolved in 500 g of anhydrous benzene, and 40 g of sodium metal are added to the resulting solution in such small portions that the temperature of the latter does not rise above 50°. The reaction mixture is then left standing for 24 hours, whereupon precipitated sodium chloride is separated by filtration, washed with benzene and the filtrate and wash liquor are distilled together and the fraction boiling at 87° under 10 Torr is collected. It consists of 4-trimethylsilyl-o-xylene (yield rate 78 percent calculated on 4-chloro-o-xylene).

b. To 50 g of 4-trimethylsilyl-o-xylene dissolved in 450 ml of aqueous 70%-pyridine there are added in small portions 210 g of potassium permanganate, while heating the mixture to the boil. Precipitated manganese dioxide is separated by filtration and the filtrate is cooled with ice, whereupon sufficient concentrated hydrochloric acid is added to adjust the pH value of the filtrate to 4. A thick oil deposits and is separated from supernatant liquid. The oil is left standing for 24 hours, whereby it crystallizes. The product is recrystallized from methanol. The resulting 4-trimethylsilyl-benzene-1,2-dicarboxylic acid (4-trimethylsilyl-phthalic acid) has a melting point of 113°C. The acid is distilled at 155°C under 8 Torr, whereupon the 4-trimethylsilyl-phthalic acid anhydride is collected. It has a melting point of 53°.

c. 4.40 g of 4-trimethylsilyl-phthalic acid anhydride, 9.6 g of urea, 0.805 g of anhydrous copper-(II) chloride and 20 mg of ammonium molybdate are added to 20 ml of nitrobenzene and the reaction mixture is then heated for 16 hours at 170°–175° while stirring. A deep blue solution is formed. After cooling to room temperature, the nitrobenzene is distilled off with steam, 30 ml of 30% aqueous sodium hydroxide solution are added to the aqueous suspension which is then filtered. The filter residue is then extracted with dilute aqueous hydrochloric acid solution and then with dilute aqueous ammonia solution, filtered and the filter residue is washed with ethanol and dried. Yield: 1.4 g.

The 4,4',4'',4'''-tetra-(trimethylsilyl)-copper phthalocyanine formed is a blue powder which dissolves very easily in toluene and N-methyl pyrrolidone with a blue color. The dyestuff can be recrystallised from dimethyl formamide.

The above example is repeated, but in lieu of trimethylchlorosilane there are used equivalent amounts of the chlorosilanes of the formula

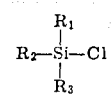

the substituents $R_1$, $R_2$ and $R_3$ are given in the respective columns of the following table, whereby the corresponding tetrasilyl-phthalocyanines having similar properties as the silyl-phthalocyanine dyestuff of Example 1 are obtained:

TABLE I

| Example No. | $R_1$ | $R_2$ | $R_3$ |
|---|---|---|---|
| 2 | phenyl | phenyl | methyl |
| 3 | benzyl | benzyl | benzyl |
| 4 | ethyl | ethyl | ethyl |
| 5 | methyl | methyl | amyl |
| 6 | cyclohexyl | methyl | methyl |
| 7 | phenyl | ethyl | ethyl |
| 8 | p-chlorophenyl | ethyl | ethyl |
| 9 | p-chlorophenyl | methyl | methyl |
| 10 | o-chlorophenyl | ethyl | ethyl |
| 11 | p-bromophenyl | methyl | methyl |
| 12 | propyl | methyl | propyl |
| 13 | p-chlorobenzyl | methyl | methyl |
| 14 | phenyl | methyl | ethyl |

EXAMPLE 15

4.40 g of 4-trimethylsilyl phthalic acid anhydride, 9.6 g of urea, 0.775 g of anhydrous nickel chloride, 1.6 g of ammonium nitrate and 20 mg of ammonium molybdate are added to 20 ml of nitrobenzene and the reaction mixture is then heated for 6 hours at 160°–165° while stirring. A thick red-brown crystal slurry having a metallic shimmer is formed. After cooling the suspension to room temperature, it is diluted with 100 ml of methanol and the reaction product obtained is filtered off under suction. The filter residue is washed with methanol and then washed, alternately, with dilute sodium hydroxide solution, dilute hydrochloric acid solution, aqueous ammonia solution and finally again with methanol and dried. 1.85 g of 4,4',4'',4'''-tetra-(trimethylsilyl)-nickel phthalocyanine are obtained in the form of a dark blue powder. It easily dissolves in aromatic hydrocarbons such as xylene and chlorobenzene with a more green colour then the copper dyestuff obtained according to Example 1.

If in this example, the nickel chloride is replaced by 0.775 g of anhydrous cobalt chloride and the procedure given in the example is otherwise followed then the corresponding 4,4',4'',4'''-tetra-(trimethylsilyl)-cobalt phthalocyanine dyestuff is obtained (yield: 1.5g). It dissolves in aromatic hydrocarbons with almost the same color as the nickel phthalocyanine dyestuff described above.

On dissolving the cobalt phthalocyanine dyestuff in a mixture of N-methyl-pyrrolidone and dilute, aqueous sodium hydroxide solution and adding sodium dithionite to the solution, a reddish blue vat is obtained which is converted by oxidation with air into a blue phthalocyanine dyestuff having similar properties.

EXAMPLE 16

10 g of 4-trimethylsilyl-phthalic acid anhydride, 100 g of urea, 4 g of anhydrous copper-(II)-chloride, 0.1 g of ammonium molybdate and 1 g of boric acid are melted together by heating to 120° and the melt is heated for 1 hour at 200°-220° while stirring. The cooled unit is boiled down with diluted sodium hydroxide solution, the blue suspension is filtered, the residue is washed with water until the washing water is neutral and is dried. The blue powder obtained is then dissolved in 10 times the amount of concentrated sulfuric acid, the solution is added dropwise to water while stirring vigorously the precipitate is filtered off, washed neutral with water and dried. On recrystallising the crude product from dimethyl formamide, a vivid blue dyestuff powder is obtained which is very easily soluble in aromatic hydrocarbons, such as benzene, xylenes, toluene or chlorobenzene.

EXAMPLE 17

4.40 g of a mixture of 3- and 4-trimethylsilyl-phthalic acid anhydride, produced by oxidation of a mixture of 3- and 4-trimethylsilyl-1,2-dimethylbenzene (in a weight ration of 3:7), 9.6 g of urea, 1.6 g of ammonium nitrate, 0.805 g of anhydrous copper-(II)-chloride and 20 mg of ammonium molybdate are added to 20 ml of nitrobenzene and the whole is heated for 6 hours at 165°-170° while stirring. After cooling to room termperature, the reaction mixture is diluted with 100 ml of methanol and the precipitated blue dyestuff is filtered off. The filter residue is washed with dilute hydrochloric acid and ammonia solution, then with ethanol and dried. The dyestuff mixture formed is a blue powder which very easily dissolves in aromatic hydrocarbons such as benzene, toluene or xylene, with a blue color.

3-trimethylsilyl-phthalic acid anhydride is obtained by repeating steps (a) and (b) of Example 1 but using in lieu of 100 g of 4-chloro-o-xylene the same amount of 3-chloro-o-xylene. There is obtained in step (a) 3-trimethylsilyl-o-xylene having a boiling point of 89°/10 Torr with an 80 percent yield rate, and from this intermediate by step (b) -trimethylsilylphthalic acid having a melting point of 118° and from the latter by distillation at 173° under 7 Torr, 3-trimethylsilylphthalic anhydride; M.P. 106°.

EXAMPLE 18

6.92 g of 4-tri-n-butyl-silyl phthalic acid anhydride, 9.6 g of urea, 0.775 g of anhydrous nickel chloride, 1.6 g of ammonium nitrate and 20 mg of ammonium molybdate are added to 20 ml of nitrobenzene and the whole is heated for 10 hours at 160°-165° while stirring. After cooling the reaction mixture to room temperature, the suspension is diluted with 200 ml of methanol, filtered and the filter residue is washed alternately with dilute hydrochloric acid and ammonia solution and finally with methanol and dried. A dark blue powder is obtained which dissolves in aromatic hydrocarbons, dimethyl formamide, ethylene glycol ethers and N-methyl-pyrrolidone with a greenish blue color.

The above example is repeated, but in lieu of trimethylchlorosilane there are used equivalent amounts of the chlorosilanes of the formula

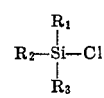

the substituents $R_1$, $R_2$ and $R_3$ are given in the respective columns of the following table, whereby the corresponding tetrasilyl-phthalocyanines having similar properties as the silylphthalocyanine dyestuff of Example 1 are obtained:

TABLE II

| Example No. | $R_1$ | $R_2$ | $R_3$ |
|---|---|---|---|
| 19 | phenyl | phenyl | methyl |
| 20 | benzyl | benzyl | benzyl |
| 21 | ethyl | ethyl | ethyl |
| 22 | methyl | methyl | amyl |
| 23 | cyclohexyl | methyl | methyl |
| 24 | phenyl | ethyl | ethyl |
| 25 | p-chlorophenyl | ethyl | ethyl |
| 26 | o-chlorophenyl | methyl | methyl |
| 27 | o-chlorophenyl | ethyl | ethyl |
| 28 | p-bromophenyl | methyl | methyl |
| 29 | propyl | methyl | propyl |
| 30 | p-chlorobenzyl | methyl | methyl |
| 31 | phenyl | methyl | ethyl |

EXAMPLE 32

8.0 g of 4-trimethylsilyl-1,2-dicyanobenzene and 1.2 g of finely pulverised 80 percent anhydrous sodium sulfide are added to 30 ml of ethylene glycol monoethyl ether and the reaction mixture is refluxed for 3 hours. 30 ml of 10% sodium hydroxide solution are then added to the blue suspension formed, the whole is heated for 1 hour at 90°-95°, then diluted with 100 ml of hot water and filtered hot. The filter residue is then washed alternately with dilute sodium hydroxide and hydrochloric acid solution and finally with methanol and dried.

The 4,4',4'',4'''-tetra-(trimethylsilyl) phthalocyanine not containing metal which is formed is a blue powder. It has even better solubility in aromatic hydrocarbons, in dimethyl formamide and dimethyl sulfoxide than the corresponding copper complex dyestuff.

EXAMPLE 33

8 g of 4-trimethylsilyl-1,2-dicyanobenzene, 2.4 g of urea and 1.47 g of anhydrous copper-(II)-chloride are added to 30 ml of nitrobenzene and the reaction mixture is heated for 2 hours at 180°-185° while stirring. After cooling to room temperature, the blue solution is diluted with 100 ml of methanol whereupon the blue dyestuff formed precipitates. It is filtered off, washed alternately with dilute ammonia and hydrochloric acid solution and then with methanol and dried. The dyestuff is identical to that described in Example 1.

If instead of 1.47 g of copper-(II)-chloride, 1.42 g of anhydrous nickel chloride of 1.42 g of anhydrous cobalt chloride are used with otherwise the procedure described in the example, the corresponding nickel or cobalt phthalocyanine dyestuffs are obtained which have similar properties.

EXAMPLE 34

8 g of 4-trimethylsilyl-1,2-dicyanobenzene and 1.4 g of anhydrous aluminum chloride in 30 ml of trichlorobenzene are heated for 1 hour at 210° while stirring. The trichlorobenzene is then distilled off with steam, this is filtered, the filter residue is extracted first with dilute hydrochloric acid solution and then with dilute aqueous ammonia solution, again filtered, and the residue is washed with metanol and dried. Yield: 9.3 g.

The 4-trimethylsilyl copper phthalocyanine obtained is a blue powder which is substantially insoluble in aromatic hydrocarbons. It is useful as a pigment.

By repeating Example 35, but using 3- or 4-trimethylsilylphthalic anhydride (Reactant A) and phthalic anhydride or a silyl-free derivative thereof (Reactant B) as listed in the respective column of the following Table in the amounts stated therein, there are obtained dyestuffs the solubility of which in organic solvents is the greater the higher their content of silyl groups.

TABLE III

| Ex. No. | Amount of reactant (A), g. | Position of trimethyl-silyl group in (A) | Amount of reactant (B), g. | Reactant B | Molar ratio of A:B | Color of organic material containing end product |
|---|---|---|---|---|---|---|
| 36 | 4.40 | 3 | 8.9 | Phthalic anhydride | 1:3 | Blue. |
| 37 | 4.40 | 4 | 2.96 | do | 1:1 | Do. |
| 38 | 6.63 | 4 | 2.96 | do | 3:1 | Do. |
| 39 | 4.40 | 4 | 10.95 | 4-chlorophthalic anhydride | 1:3 | Greenish-blue. |
| 40 | 4.40 | 3 | 10.95 | do | 1:3 | Do. |
| 41 | 4.40 | 4 | 4.54 | 4-bromophthalic anhydride | 1:1 | Do. |
| 42 | 4.40 | 4 | 13.02 | 4,5-dichlorophthalic anhydride | 1:3 | Do. |
| 43 | 4.40 | 4 | 18.36 | 4,5-dibromophthalic anhydride | 1:3 | Bluish-green. |
| 44 | 6.63 | 4 | 3.06 | 3,5-dibromophthalic anhydride | 3:1 | Blue. |
| 45 | 4.40 | 3 | 13.02 | 3,4-dichlorophthalic anhydride | 1:3 | Greenish-blue. |
| 46 | 4.40 | 4 | 13.02 | 3,6-dichlorophthalic anhydride | 1:3 | Do. |
| 47 | 4.40 | 4 | 4.34 | 3,5-dichlorophthalic anhydride | 1:1 | Do. |
| 48 | 4.40 | 4 | 17.16 | 3,4,5,6-tetrachlorophthalic anhydride | 1:3 | Bluish-green. |
| 49 | 4.40 | 4 | 27.84 | 3,4,5,6-tetrabromophthalic anhydride | 1:3 | Green. |
| 50 | 4.40 | 4 | 3.28 | 3-hydroxyphthalic anhydride | 1:1 | Blue. |
| 51 | 4.40 | 3 | 3.56 | 3-methoxyphthalic anhydride | 1:1 | Do. |
| 52 | 4.40 | 4 | 10.68 | 4-methoxyphthalic anhydride | 1:3 | Do. |
| 53 | 4.40 | 4 | 3.24 | 4-methylphthalic anhydride | 1:1 | Do. |
| 54 | 4.40 | 4 | 9.72 | 3-methylphthalic anhydride | 1:1 | Do. | the residue is filtered and the filter residue is washed alternately with dilute hydrochloric acid solution and sodium hydroxide solution and then with methanol and dried.

The 4,4',4'',4'''-tetra-(trimethylsilyl)-aluminum phthalocyanine formed is a blue-green powder which dissolves in toluene with a blue-green color. It is of the formula

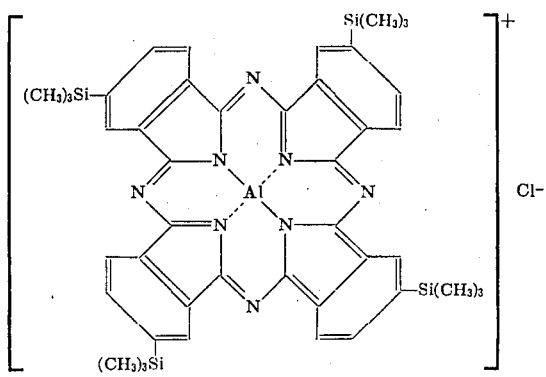

EXAMPLE 35

4.40 g of 4-trimethylsilyl phthalic anhydride (0.02 mole), 8.9 g of phthalic anhydride (0.06 mole), 48 g of urea, 3.22 g of anhydrous copper-(II) chloride and 80 mg of ammonium molybdate are added to 80 ml of nitrobenzene and the suspension is then heated for 10 hours at 170°–175° while stirring. A blue suspension is formed. After cooling to 80°, the nitrobenzene is distilled off with steam, 30 ml of 30% aqueous sodium hydroxide solution are added to the aqueous suspension,

EXAMPLE 55

5 g of 4-trimethylsilyl-3-chlorophthalic acid anhydride, 9.8 g of urea, 0.79 g of copper-(II) chloride, 19 mg of ammonium molybdate and 85 g of boric acid are heated together for 18 hours in 30 ml of trichlorobenzene at 190°–195° while stirring. The trichlorobenzene is subsequently removed by steam distillation and the residue is treated first with aqueous 30%-sodium hydroxide solution and then with hydrochloric acid. After washing with aqueous ammonia solution and methanol and then drying, 1.2 g of a greenish blue phthalocyanine dyestuff is obtained which dissolves in toluene, benzene and N-methylpyrrolidone with a blue-green color.

The 4-trimethylsilyl-3-chlorophthalic acid anhydride used as starting material is obtained as follows:

100 g of 3,4-dichloro-1,2-dimethyl-benzene and 70 g of trimethylchlorosilane in 80 ml of toluene are slowly added dropwise at 110° to 27 g of metallic sodium in 400 ml of toluene. The reaction mixture is then stirred for 2 hours at this temperature, precipitated sodium chloride is removed by filtration and the filtrate is rinsed with toluene and distilled in vacuo. The fraction having a boiling range of 110°–119°/10 Torr consists of 4-trimethylsilyl-3-chloro-1,2-dimethyl-benzene. (Yield rate 52 percent calculated on dichloro-o-xylene). 60 g of the latter compound are then mixed with 140 g of potassiumpermaganate in 200 ml aqueous pyridine (volumn ratio 1:1) and the pH value of the mixture is adjusted to 3.5 ; 4-trimethylsilyl-3-chlorophthalic acid is obtained from which the 4-trimethylsilyl-3-chlorophthalic acid anhydride is obtained by distillation at 177°–182° / 10 Torr.

EXAMPLE 56

8.16 g of 4-tert-butyl phthalic acid anhydride, 14.4 g of urea, 1.61 g of anhydrous copper-(II) chloride and 60 mg of ammonium molybdate are added to 60 g of nitrobenzene and the reaction mixture is heated while stirring for 44 hours at 170°–175°. A deep blue solution is formed. After cooling to room temperature, the reaction mixture is diluted with 300 g of chloroform, the blue solution is filtered and the mixture of solvents is removed from the filtrate with steam. The aqueous suspension is then filtered, the solid residue is boiled down with 150 g of ethanol, filtered and the filter residue is washed first with ethanol, then with dilute aqueous hydrochloric acid solution and then with dilute aqueous ammonia solution, again with ethanol and dried. Yield: 3.65 g.

The 4,4', 4'', 4'''-tetra-(tert-butyl)-copper phthalocyanine dyestuff formed is a blue powder which dissolves very easily in toluene and chloroform with a pure, intensively blue color. The dyestuff can be recrystallized from dimethyl formamide.

If in this example the anhydrous copper-(II) chloride is replaced by equivalent amounts of anhydrous nickel chloride or anhydrous cobalt-(II) chloride and otherwise the procedure given in the example is followed, then the corresponding nickel or cobalt phthalocyanine dyestuffs are obtained. They dissolve in toluene or chloroform with a blue-green color.

If instead of the 4-tert-butyl phthalic acid anhydride, equivalent amounts of 4-(1,1,2,2-tetramethylpropyl) phthalic acid are used with otherwise the procedure given in the example, then 4,4', 4'', 4'''-tetra-(1,1,2,2-tetramethylpropyl)-copper phthalocyanine is obtained. This dyestuff has similar valuable properties and dissolves very easily in toluene and chloroform with a pure blue shade.

4-(1,1,2,2-tetramethylpropyl) phthalic acid is obtained by adding 2,3,3-trimethylbutene-(1,2) to o-xylene in the presence of anhydrous aluminum chloride in nitromethane and then oxidising the 4-(1,1,2,2-tetramethylpropyl)-1,2-dimethylbenzene formed with potassium permanganate in aqueous pyridine.

EXAMPLE 57

7.36 g of 4-tert-butyl-1,2-dicyanobenzene and 1.2 g of finely pulverised 80% anhydrous sodium sulfide are added to 30 ml of ethylene glycol monoethyl ether and the reaction mixture is refluxed for 3 hours. 30 ml of 10% sodium hydroxide solution are then added to the blue suspension formed, the whole is heated for 1 hour at 90°–95°, diluted with 100 ml of hot water and then filtered hot. The filter residue is then washed alternatively with dilute sodium hydroxide solution and hydrochloric acid solution and finally with methanol and dried. Yield: 5.2 g.

The metal-free 4,4', 4'', 4'''-tetra-(tert-butyl) phthalocyanine formed is a blue powder which dissolves in xylene or chlorobenzene with a green-blue color.

EXAMPLE 58

18.4 g of 4-tert-butyl-1,2-dicyanobenzene, 38.4 g of 1,2-dicyanobenzene, 6 g of urea and 14.7 g of anhydrous copper-(II) chloride are added to 250 ml of nitrobenzene and the suspension is heated for 2 hours at 180°–185° while stirring. A blue precipitate is formed. After cooling to 100°, this is filtered off and the residue is washed with ethanol, then with aqueous ammonia and finally with dilute hydrochloric acid solution and dried. Yield: 53 g.

The 4-tert-butyl copper phthalocyanine pigment obtained is a blue powder which is insoluble for all practical purposes in aromatic hydrocarbons.

The pigment can be conditioned or finely distributed, e.g. by dissolving and recrystallizing from concentrated sulfuric acid or by milling with salt. In aromatic hydrocarbons, the pigment so finished is stable to crystallisation and flocculation. On dissolving and recrystallizing 1 part of 4-tert-butyl copper phthalocyanine and 1 to 4 parts of copper phthalocyanine from concentrated sulfuric acid, a blue pigment mixture is obtained which is stable to crystallisation and flocculation.

If in this example the 18.4 g of 4-tert-butyl-1,2-dicyanobenzene are replaced by 36.8 g of 4-tert-butyl-1,2-dicyanobenzene and the 38.4 g of 1,2-dicyanobenzene are replaced by 85.6 g of 1,2-dicyanobenzene and otherwise the procedure given in this example is followed, then 4,4'-bis-tert-butyl copper phthalocyanine is obtained which is only slightly soluble in chloroform and otherwise has properties similar to those of 4-tert-butyl copper phthalocyanine.

EXAMPLE 59

11.1 g of 4-(1,1,3,3-tetramethylbutyl) phthalic acid, 14.4 g of urea, 1.61 g of anhydrous copper-(II) chloride and 100 mg of ammonium molybdate are added to 40 ml of nitrobenzene and the reaction mixture is heated for 24 hours at 170°–175° while stirring. After cooling to room temperature, the blue suspension obtained is diluted with 200 ml of chloroform, filtered and the mixture of solvents is removed from the filtrate by steam distillation. The aqueous suspension is then filtered, the residue is boiled down with 150 ml of ethanol, filtered off and the filter residue is washed first with ethanol, then alternately with aqueous ammonia solution and hydrochloric acid solution and finally with ethanol and dried. Yield: 2 g.

The 4,4',4'',4'''-tetra-(1,1,3,3-tetramethylbutyl)-copper phthalocyanine formed dissolves in toluene, chloroform or dimethyl formamide with a pure blue color.

If in this example, the 4-(1,1,3,3-tetramethylbutyl) phthalic acid is replaced by equivalent amounts of 4-(1,1,3,3,-5,5-hexamethylhexyl) phthalic acid, then a dyestuff is obtained which, in addition, is also soluble in acetone.

The 4-(1,1,3,3-tetramethylbutyl)- or 4-(1,1,3,3,5,5-hexamethylhexyl) phthalic acids used as starting products are obtained by adding di- or tri- isobutylene to o-xylene in nitromethane in the presence of anhydrous aluminum chloride and subsequently oxidising the 4-(1,1,3,3,-tetramethylbutyl) — or 4-(1,1,3,3,5,5-hexamethylhexyl — 1,2-dimethylbenzene formed with potassium permanganate in aqueous pyridine.

EXAMPLE 60

5.04 g of 4-tert-butyl-5-methoxy-phthalic acid, 6.0 g of urea, 1.6 g of ammonium nitrate, 0.805 g of anhydrous copper-(II) chloride and 40 mg of ammonium molybdate are added to 20 ml of nitrobenzene and then the reaction mixture is heated for 24 hours at 150°–155° while stirring. After cooling to room temperature, the green suspension is diluted with 100 ml of ethanol, filtered and the filter residue is washed first with dimethyl formamide and then alternately with aqueous ammonia, dilute hydrochloric acid and acetone and finally dried. Yield: 1.3 g.

The dyestuff formed is a green pigment. Pure blue-green printing inks of great color strength or blue-green polyvinylchloride films having good fastness to migration are obtained therewith.

If in this example the 4-tert-butyl-5-methoxy-phthalic acid is replaced by equivalent amounts of 4-tert-butyl-5-chlorophthalic acid and otherwise the procedure given in this example is followed, then a green pigment having similar properties is obtained.

The 4-tert-butyl-5-methoxy- or -5-chloro- phthalic acid used as starting material is obtained by condensation of tert-butyl chloride with 5-methoxy- or 5-chloro-1,2-dimethylbenzene in the presence of anhydrous zinc chloride and subsequent oxidation of the condensation products obtained with potassium permanganate in boiling aqueous pyridine.

EXAMPLE 61

300g of caprolactam, 300 mg of sebacic acid, 900 mg of 4,4',4'',4'''-tetra-(trimethylsilyl)-copper phthalocyanine dyestuff, produced according to Example 16, are dissolved by heating in 50 ml of distilled water. The solution is then heated in a 1 litre $V_4A$ steel autoclave to about 240° under an atmosphere of nitrogen. The steam pressure so attained is about 20–25 atm. excess pressure. The pressure is reduced to normal pressure with 1 hour while the temperature is maintained, the water added being evaporated. The reaction mixture is then kept for 16 hours at 250°. On extruding the spinning mass formed under nitrogen pressure through a die and then drawing, pure blue colored Nylon threads are obtained which have very good fastness to light as well as good wet fastness properties.

EXAMPLE 62

3 g of 4,4',4'',4'''-tetra-(trimethylsilyl)-copper phthalocyanine dyestuff, produced according to Example 1, are mixed with 1000 g of Nylon 66 and the mixture is melted in the usual way at about 275° under an $N_2$ atmosphere. After spinning the thickly viscous mass so obtained, pure blue colored fibers having good wet and light fastness properties are obtained. The fibers are optionally drawn and/or crimped and anti-crease processed.

If, instead of the Nylon 66, equimolar amounts of "Perlon L" or "Grilon" ar used with the procedure given in the example, then blue colored fibers having similarly good properties are also obtained.

EXAMPLE 63

30 g of coconut oil fatty acid modified alkyd resin having 32% fatty acid content, 15 g of melamine formaldehyde resin dissolved in 15 g of butanol are intimately mixed with 0.4 g of 4,4',4'',4'''-tetra-(trimethylsilyl)-nickel phthalocyanine dyestuff obtained according to Example 15, in 40 ml of xylene mixture and 9.6 g of ethylene glycol monomethyl ether. The lacquer formed is applied to aluminum foil in a film thickness of 100 $\mu$ and, after evaporation of the solvent, is stoved for 30 minutes at 130°. A pure, greenish blue colored lacquer having excellent fastness to light is obtained.

If instead of the 4,4',4'',4'''-tetra-(trimethylsilyl)-nickel phthalocyanine dyestuff, 0.4 g of the 4,4',4'',4'''-tetra-(trimethylsilyl)-copper phthalocyanine dyestuff obtained according to Example 1 are used with otherwise the procedure described in the example, then a pure, reddish blue colored lacquer having equally excellent fastness to light is obtained.

EXAMPLE 64

0.1 g of tetratrimethylsilyl-copper-phthalocyanine produced as described in Example 1, and 100 g of polypropylene pellets are intimately mixed in a rotary mixing drum and the resulting mixture is further compounded in a Banbury mixer or a two-roll mill at 130° until a homogeneously colored composition has been obtained. The mass is then pressed at 250° to form foils of 1 mm thickness. The foils are colored a greenish-blue shade of excellent light fastness. The colored composition can also be extruded at 250° or spun from the melt at 285° to 300°. The extruded films or spun filaments have greenish-blue shade, also of excellent light fastness.

EXAMPLE 65

300 g of caprolactam, 300 mg of sebacic acid, 900 mg of 4,4',4'',4'''-tetra-(tert-butyl)-copper phthalocyanine dyestuff, produced according to Example 56, are dissolved in 50 ml of hot distilled water. The solution is then heated in a 1 litre capacity $V_4A$ steel autoclave under an atmosphere of nitrogen to about 240°. A steam pressure of 20–25 excess atmospheres is attained. The pressure is reduced to normal within 1 hour while maintaining the temperature whereupon the water added evaporates. The reaction mixture is then kept for 16 hours at 250°. On extruding the spinning mass formed through a die under nitrogen pressure and then drawing, pure blue colored nylon threads are obtained which have very good fastness to light and good wet fastness properties.

EXAMPLE 66

30 g coconut alkyd resin having 32% fatty acid content, 15 g of melamin formaldehyde resin dissolved in 15 g of butanol are intimately mixed with 0.4 g of 4,4',4'',4'''-tetra-(tertbutyl)-nickel phthalocyanine dyestuff, obtained according to Example 56, in 40 ml of a mixture of xylenes and 9.6 ml of ethylene glycol monomethyl ether. The lacquer obtained is applied in a thickness of 100 $\mu$ to aluminium foils and, after evaporation of the solvents, it is stoved for 30 minutes at 130°. A pure, greenish blue lacquer having excellent fastness to light is obtained.

If instead of the 4,4',4'',4'''-tetra-(tert-butyl)-nickel phthalocyanine dyestuff, 0.4 g of the 4,4',4'',4'''-tetra-(tert-butyl)-copper phthalocyanine dyestuff obtained according to Example 56, or 0.4 g of the 4,4',4'',4'''-tetra-(1,1,3,3-tetramethylbutyl)-copper phthalocyanine dyestuff obtained according to Example 59 are used with otherwise the procedure given in the example, then a pure, reddish blue lacquer also having excellent fastness to light is obtained.

EXAMPLE 67

3 g of 4,4',4'',4'''-tetra-(tert-butyl)-copper phthalocyanine dyestuff produced according to Example 56, are mixed with 1000 g of Nylon 66 and melted in the usual way at about 275° under an $N_2$ atmosphere. After spinning the viscous mass so obtained, pure blue colored fibers are obtained which have good wet and light fastness properties. Optionally the fibers are drawn and/or crimped or anti-crease processed.

If instead of Nylon 66, equimolar amounts of "PER-

LON L" or "GRILON" are used and the procedure given in the example is followed, then blue colored fibers are also obtained having similar good properties.

EXAMPLE 68

300 g of terephthalic acid dimethyl ester, 300 g of glycol and 10 g of 4,4',4'',4'''-tetra-(tert-butyl)-nickel phthalocyanine dyestuff produced according to Example 56, are heated for 3 hours at 130° under an atmosphere of nitrogen until a clear solution is obtained. 1 g of antimony oxide is then added to the solution and the reaction mixture is kept under vacuum and a nitrogen atmosphere for 6 hours at 180°–200°. On extruding the spinning mass formed through a die under nitrogen pressure and then drawing, pure blue-green colored polyester fibers are obtained which have very good light fastness and good wet fastness properties.

EXAMPLE 69

0.1 g of 4,4',4'',4'''-tetra-(tert-butyl)-copper phthalocyanine produced as described in Example 56, and 100 g of polypropylene pellets are intimately mixed in a rotary mixing drum and the resulting mixture is further compounded in a Banbury mixer or a two-roll mill at 130° until a homogeneously colored composition has been obtained. The mass is then pressed at 250° to form foils of 1 mm thickness. The foils are colored a greenish-blue shade of excellent light fastness. The colored composition can also be extruded at 250° or spun from the melt at 285° to 300°. The extruded films or spun filaments have greenish-blue shade, also of excellent light fastness.

We claim:
1. A phthalocyanine dyestuff which consists of 4,4',4'',4'''-tetra(trimethylsilyl)-copper phthalocyanine.
2. A phthalocyanine dyestuff which consists of 4,4',4'',4'''-tetra-(trimethylsilyl)-cobalt phthalocyanine.
3. A phthalocyanine dyestuff which consists of 4,4',4'',4'''-tetra-(trimethylsilyl)-nickel phthalocyanine.
4. A phthalocyanine dyestuff which consists of 4,4',4'',4'''-tetra-(tri-n-butyl-silyl)-nickel phthalocyanine.
5. A phthalocyanine dyestuff which consists of 4,4',4'',4'''-tetra-(trimethylsilyl)-phthalocyanine.

* * * * *